(12) United States Patent
So

(10) Patent No.: US 7,081,821 B2
(45) Date of Patent: Jul. 25, 2006

(54) ELECTRONIC FENCE SYSTEM AND CONTROLLING METHOD THEREOF

(76) Inventor: Ho Yun So, 8-1006 Kwangjang Apt., 28 Youido-dong, Yongdungpo-gu, Seoul 150-762 (KR)

( * ) Notice: Subject to any disclaimer, the term of this patent is extended or adjusted under 35 U.S.C. 154(b) by 127 days.

(21) Appl. No.: 10/845,039

(22) Filed: May 12, 2004

(65) Prior Publication Data

US 2005/0139169 A1    Jun. 30, 2005

(30) Foreign Application Priority Data

Dec. 29, 2003  (KR) .................... 10-2003-0098864

(51) Int. Cl.
*G08B 23/00* (2006.01)
(52) U.S. Cl. ................ 340/573.3; 340/573.4; 119/720; 119/721
(58) Field of Classification Search ............ 340/573.3, 340/573.4; 119/720, 721
See application file for complete search history.

(56) References Cited

U.S. PATENT DOCUMENTS

| | | | |
|---|---|---|---|
| 5,121,711 A | 6/1992 | Aine | 119/29 |
| 5,381,129 A | 1/1995 | Boardman | 340/573 |
| 5,408,956 A | 4/1995 | Quigley | 119/720 |
| 5,682,839 A | 11/1997 | Grimsley et al. | 119/721 |
| 5,781,113 A | 7/1998 | Yarnall, Sr. et al. | 340/573 |
| 5,808,551 A | 9/1998 | Yarnall, Jr. et al. | 340/573 |
| 5,844,489 A | 12/1998 | Yarnall, Jr. et al. | 340/573 |
| 5,967,094 A * | 10/1999 | Grimsley et al. | 119/721 |
| 6,043,748 A | 3/2000 | Touchton et al. | 340/573.3 |
| 6,360,698 B1 * | 3/2002 | Stapelfeld et al. | 119/720 |
| 6,598,563 B1 * | 7/2003 | Kim et al. | 119/720 |
| 2001/0030610 A1 | 10/2001 | Rochelle et al. | 340/686.6 |
| 2002/0040689 A1 * | 4/2002 | So | 119/720 |
| 2002/0073933 A1 | 6/2002 | Oakman | 119/721 |

* cited by examiner

*Primary Examiner*—Daniel Wu
*Assistant Examiner*—Edny Labbees
(74) *Attorney, Agent, or Firm*—Sheridan Ross P.C.

(57) ABSTRACT

An electronic fence system comprises a fence wire which radiates a radio signal for defining a boundary; a transmitter electrically connected to the fence wire and transmitting a boundary radio signal including a mode selection signal; and a receiver attached to the pet, that receives the boundary defining signal, and that generates either electrical shock only, or a combination of electrical shock and vibration as well as sound depending on the mode selection signal.

If the pet has a hearing loss, or the circumference is noisy, a warning signal can be given through a touch to the skin of the pet. Since a vibration is applied first, and the shock follows it, no severe shock need be applied to the pet that will return into the confined area after having received a vibration. A pet's activity is restricted in a predetermined area.

6 Claims, 12 Drawing Sheets

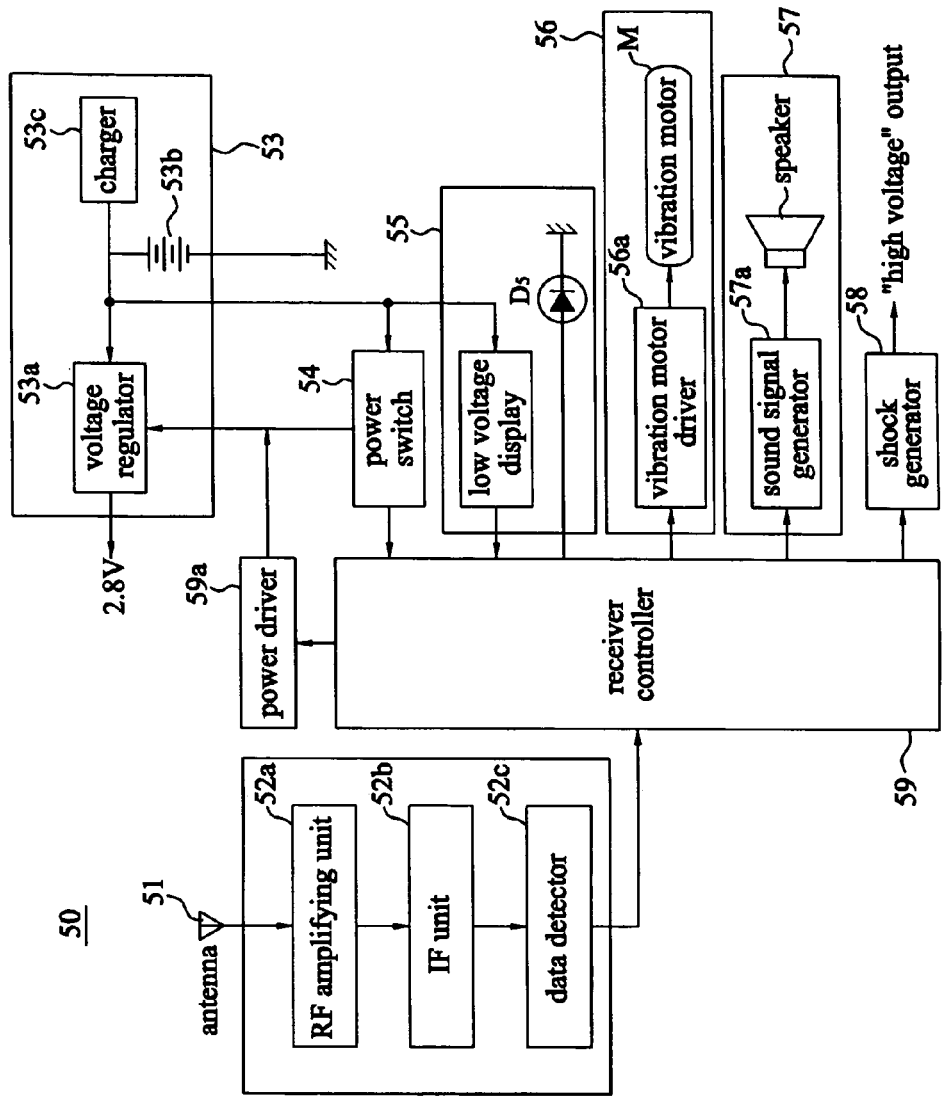

ELECTRONIC FENCE SYSTEM AND CONTROLLING METHOD THEREOF

BACKGROUND OF THE INVENTION

1. Field of the Invention

The present invention relates to an electronic fence system and controlling method and, more specifically, to a system and method in which a pet's activity in a predetermined area is restricted when the pet approaches a confined area. A boundary display signal is produced from the fence wire or a radio boundary display signal is sent to a receiver worn on the pet. The receiver gives a vibration (or vibration accompanied by sound) followed by an electric shock or a shock only to the pet. Therefore, the pet cannot move out of the confined area.

2. Description of the Prior Art

Domestic animals are naturally wild. Thus, if pets are not chained up or a fence for confining pets is not established, they can run away and return to the wild or wander about out of the owner's control.

Most people reserve space (e.g. yard etc.) in which their pet can run freely, and the space is enclosed with a fence including braces and nets. Pets are let loose in the space to run freely.

There are problems, however, in that a fence requires an installation cost, and the fence creates an ill appearance. Further, the fence can be spoiled owing to external forces like wind or rain, and a gap through which pets can pass may be formed. The fence then, requires constant management and maintenance, as well as management personnel and its accompanying cost.

To address these problems, an electric shock method was devised. In the method, a wire is installed within the area and a signal is emitted from the wire. A receiver attached to the pet generates a shock to the pet when it approaches the wire within a certain range. The pet is confined within a boundary in which it can be controlled.

One example of the method in which a wire is installed for sending a signal is disclosed in U.S. Pat. No. 5,967,094. FIG. 1 illustrates the pet confinement system using a wire in accordance with the prior art.

A front yard or garden of a house H has a confined area 2 in which a pet may move about freely. A loop of wire represented by a dashed line is buried in the yard along the boundary of the confined area 2.

The wire 3 is electrically connected to a transmitter 4a placed inside a garage G attached to a house H. The transmitter 4a generates RF boundary signals which are radiated through a buried wire 3. As a pet approaches the wire within a predetermined range, a receiver 5a attached on the pet 1 detects the boundary signal radiated from the wire 3.

When the receiver 5a receives the boundary signal radiated from the wire 3, a shock is applied to pet 1 to cause the pet 1 not to escape from the confined area.

Further, the transmitter 4a has a lightning shelter circuitry provided at the wire 3, for protecting an energy shock such as lightning.

A radio method, as another method, was devised. In this method, a transmitter that radiates radio signals though an antenna is placed in the center of the pet's activity area. If a pet goes far away from the antenna, out of a predetermined range, a radio signal is no longer received and a receiver attached to the pet generates an electrical shock to the pet so that it may not escape from the designated area.

Such a radio method is disclosed in U.S. Pat. No. 5,381,129. FIG. 2 illustrates a pet confinement system by a radio method in accordance with the prior art.

The transmitter 4b is installed in a confined area for a pet 1 inside or near a house H. The transmitter 4b radiates a radio signal to restrict the pet's movement in the confined area according to the predetermined range from the installation point of the transmitter 4b.

The pet 1 wears a collar/receiver 5b that receives a radio signal emitted from the transmitter 4b. The receiver 5b contains a warning or shock system if the pet 1 wanders near the boundary of the confined area.

The confined area of the pet 1 is divided into several areas, such as a safe area 6, a warning area 7, and a shock area 8. The safe area 6 comprises an area in which the pet 1 receives no stimuli from the receiver 5b and can move freely around. The warning area 7 comprises an area in which the pet 1 moves into the area and receives a warning signal, in the nature of a sound or flashing light, from the receiver 5b. Next, the shock area 8 comprises an area in which the pet 1 moves into the area, and the receiver 5b generates a control signal which is a shock and gives a shock to the pet 1.

Therefore, the pet 1 remains within the safe area 6 but if the pet 1 moves into the warning area 7, it will be warned to move back into the safe area 6. Further, if the pet 1 moves into the shock area 8, a shock may be given to the pet 1 indicating no further moving forward.

The conventional confinement system using a fence or a radio has problems in that since the sound signal is used as the warning, the pet cannot recognize the warning if the pet has hearing loss or the pet is in a noisy circumference.

It has a further problem in that an electric shock is directly given when moving out of the safe area, thus enabling the pet to get an excessive shock.

SUMMARY OF THE INVENTION

In order to resolve these problems, the inventor suggests the inventive electronic fence system and controlling method thereof, in which, a vibration (or vibration accompanied by sound), or an electric shock is generated and given to the pet according to the pet's approaching distance to the boundary of a confined area. This method shocks the skin surface and indicates no further moving forward.

One objective of the present invention is an electronic fence system and a controlling method thereof, in which a pet that has a hearing loss or is in a noisy circumference can receive a warning signal through its skin, which indicates to the pet that it is approaching too closely to the boundary of the system.

Another objective of the present invention is to produce an electronic fence system and a controlling method thereof, in which no electric shock is directly applied to the pet as the pet approaches the fence, but rather, depending on the distance, a vibration, a vibration accompanying a sound, or an electric shock are given to the pet sequentially, thus keeping the pet within the confined area.

Another objective of the present invention is to produce an electronic fence system and a controlling method thereof in which a power source can be applied to the receiver so that it is only activated when the power switch is pressed for a predetermined length of time, thus preventing an arbitrary operation of the power switch by an external object.

In order to accomplish the object of the present invention, an electronic fence system comprises: a fence wire buried in a yard along the boundary of a confined area within which a pet may move about freely, and which radiates a radio signal for defining a boundary; a transmitter electrically connected to the fence wire and transmitting a boundary radio signal for defining the boundary to the fence wire, the boundary signal including a mode selection signal for selecting a direct shock mode to the pet or a combination shock mode after first producing a sound; and a receiver attached to the pet, that receives the boundary defining signal with respect to a pet's approach to the fence wire, and that generates either electrical shock only, or a combination of electrical shock and vibration, or electrical shock and vibration as well as sound depending on the mode selection signal.

The transmitter further includes: a power supply unit which receives alternating current power source and supplies constant voltage; a mode selector for selecting either electrical shock only, a combination of electrical shock and vibration; or electrical shock and vibration as well as sound to the pet; a disconnection display for sensing a breaking of the fence wire, generating a disconnection signal, and displaying a disconnection; a shock level selector for selecting a level of shock to the pet; a transmitter controller for controlling the above units and transmitting a boundary display signal to the fence wire the boundary signal including a data comprising a level inputted from the shock level selector and a mode transmitted from the mode selector, and the transmitter controller for displaying a disconnection status according to a disconnection sensing signal transmitted from the disconnection display; and an amplifying unit for amplifying a signal transmitted to the fence wire from the transmitter controller.

The signal, which is applied to the fence wire from the transmitter controller, is an amplitude modulation signal modulated with a 10 kHz signal, and the signal includes an identification number, a shock level, and mode selection data.

The intensity of the radio signal radiated from the fence wire is dependent on the receiver, which is attached to the pet, approaching within 10 m from the boundary of the confined area.

The disconnection display comprises a disconnection sensor for sensing whether it has been disconnected or not by measuring the voltage power applied to the fence wire at one end of it, and also for sending the sensing status to the transmitter controller, and the disconnection display also includes a disconnection display emit diode for displaying the disconnection status according to the control of the transmitter controller.

The receiver further includes: a first and a second sensor unit for transforming radio signal radiated from the fence wire into binary data; a power supplier including a voltage regulator, a recharge battery, and a charger; a power switch for applying power to the power supplier while the user pushes the power switch; a low voltage display for sensing the voltage of the recharge battery and for displaying its low voltage status; a vibration generator for applying a vibration to the pet according to the command of the receiver controller; a sound signal generator for generating a sound according to the command of the receiver controller; a shock generator for giving an electrical shock to the pet according to the command of the receiver controller; a receiver generator for receiving the signal sent from the transmitter through the first and the second sensor, and controlling the respective units; and a power actuator for continually applying power to the power supplier according to a power hold signal received from the receiver controller.

The first sensor unit and the second sensor unit comprise a first and a second sensor, a first and a second filter, a first and a second amplifier, and a first and a second waveform generator, respectively.

A method for controlling the electronic fence comprises: a transmitter that emits a radio signal through a fence wire provided along the boundary of a confined area, a radio signal including a mode selection signal and a shock level signal, a mode selection signal which chooses either shock mode only or a combination mode with vibration followed by shock depending on the mode selector chosen by the user, and a receiver attached to the body of a pet, which receives the radio signal, and applies to the pet either a shock only; a vibration followed by a shock; or a vibration followed by a shock and accompanied by a sound, which depends on the mode data embedded in the signal, wherein the level of shock depends on the data of shock level embedded in the radio signal.

Further, power is applied to the power supplier of the receiver when the power switch of the receiver is ONed for longer than a predetermined time.

Furthermore, a shock to the pet by the receiver is applied for an amount of time that cannot physically damage the pet.

A method for controlling electronic fence comprises: a transmitter that emits a radio signal through an antenna provided at the center of a confined area, the radio signal that is modulated by an FM, and the radio signal that includes a shock level signal and a mode selection signal that chooses either shock mode only, or a combination mode with vibration followed by shock depending on the mode selector chosen by the user, and a receiver attached to the body of a pet which receives the radio signal modulated by FM, detects the data embedded on the signal, and applies to the pet either shock only; vibration followed by shock; or a combination of vibration and sound followed by a shock, wherein the level of the shock depends on the shock level data embedded in the radio signal.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
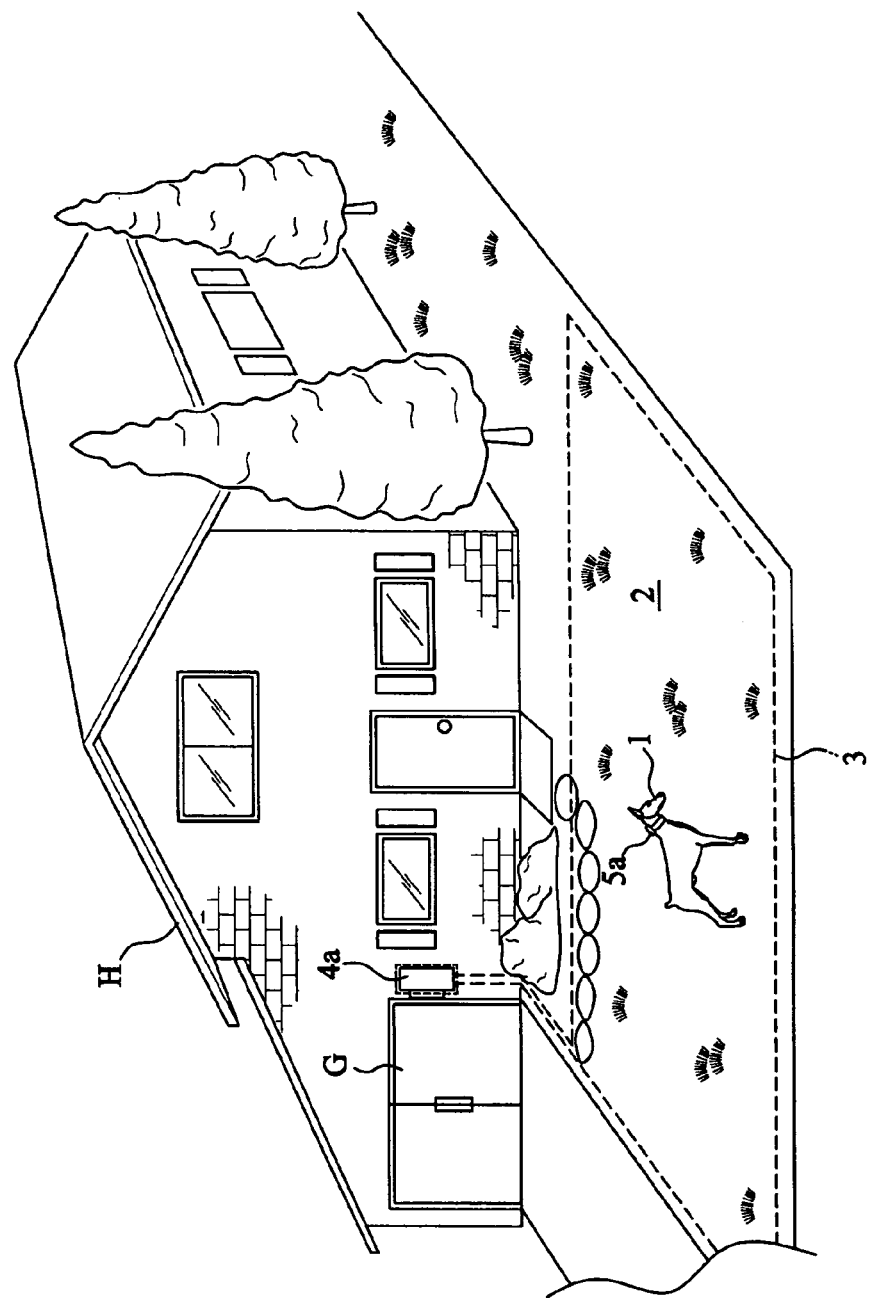
FIG. 1 is a view illustrating the pet confinement system using a wire in accordance with the prior art.
Figure 2:
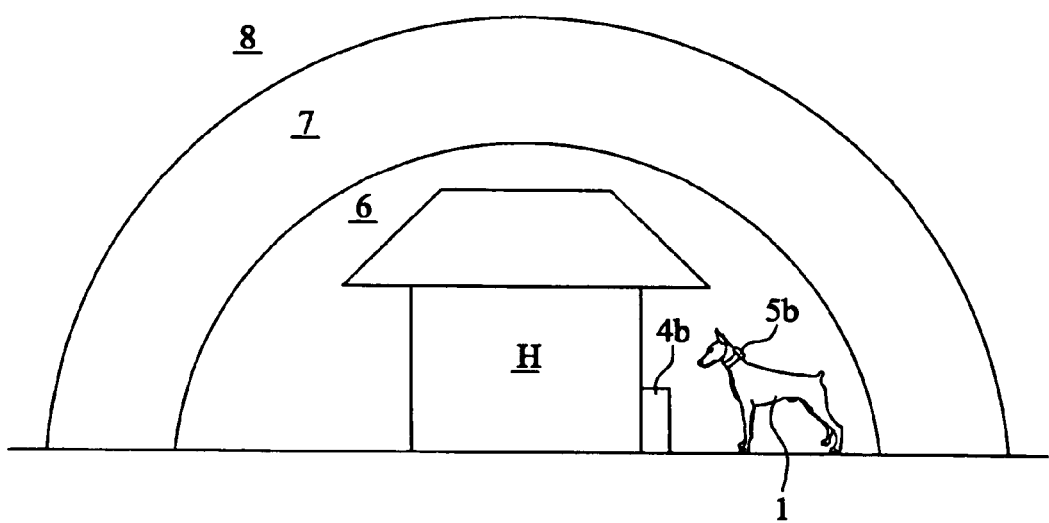
FIG. 2 is a view illustrating a pet confinement system by a radio method in accordance with the prior art.

Reference should now be made to the drawings. The same reference numerals are used throughout the different drawings to designate components that are the same or similar.

Figure 3:
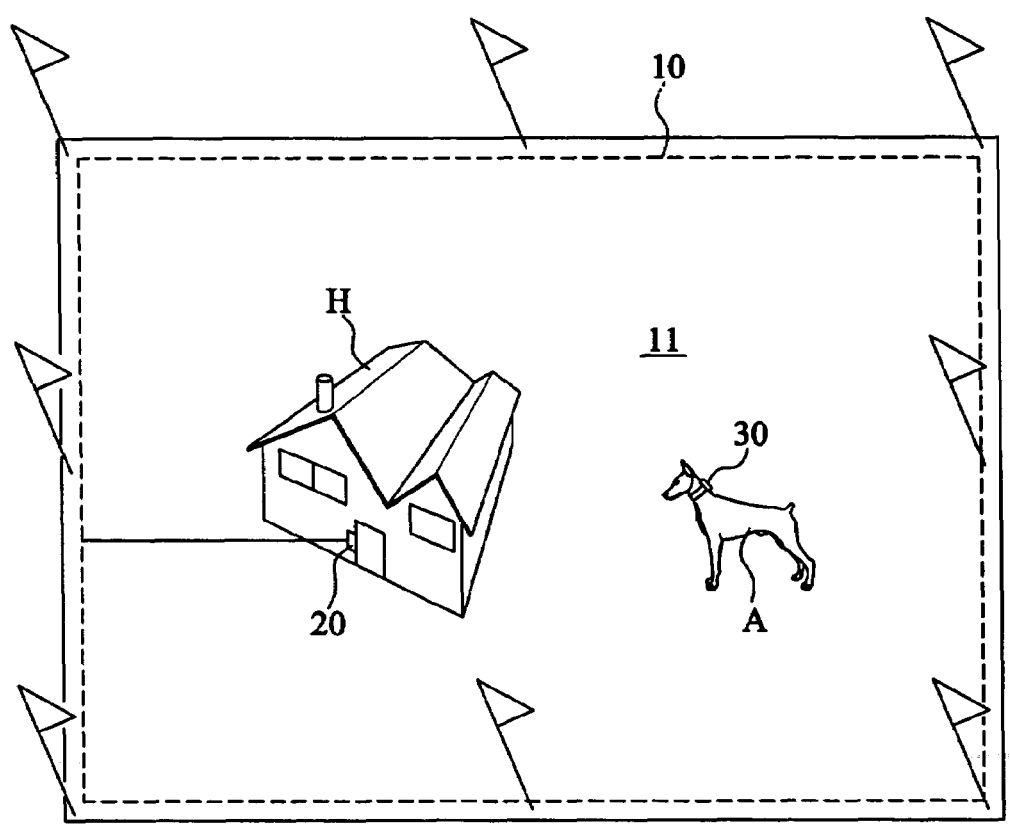
FIG. 3 is a view of an electronic system adopting a fence wire method according to the present invention.

FIG. 3 is a view of an electronic system adopting a fence wire method according to the present invention.

An electronic fence system consists of a fence wire 10, which radiates a wireless signal for defining the boundary and is buried in the yard along the boundary of a confined area 11 within which a pet A may move about freely; a transmitter 20 electrically connected to the fence wire 10 and transmitting a boundary wireless signal for defining the boundary 11 to the fence wire 10, the boundary wireless signal includes a direct shock mode to the pet or a combination shock mode after first producing a sound; and a receiver 30 attached to the pet A which receives the boundary defining signal in respect to the pet's approach to the fence wire, and, depending on the selection mode, generates either electrical shock only; a combination of electrical shock and vibration; or a combination of electrical shock and vibration as well as sound.

The fence wire 10 is buried along the boundary of a confined area 11 in the yard or garden of a house H, and it is connected to the transmitter 20 provided inside the house H. The receiver 30 is attached to the body (e.g. the neck) of the pet with a collar.

Domestic pet A can move freely in the confined area 11, but as it approaches a predetermined area (e.g. 10 m distance from the fence wire 10 provided along the boundary of the confined area 11) the receiver 30 attached on the pet A detects radio frequency (RF) wireless signals radiated from the fence wire 10 and gives a vibration or shock to the pet.

Figure 4:
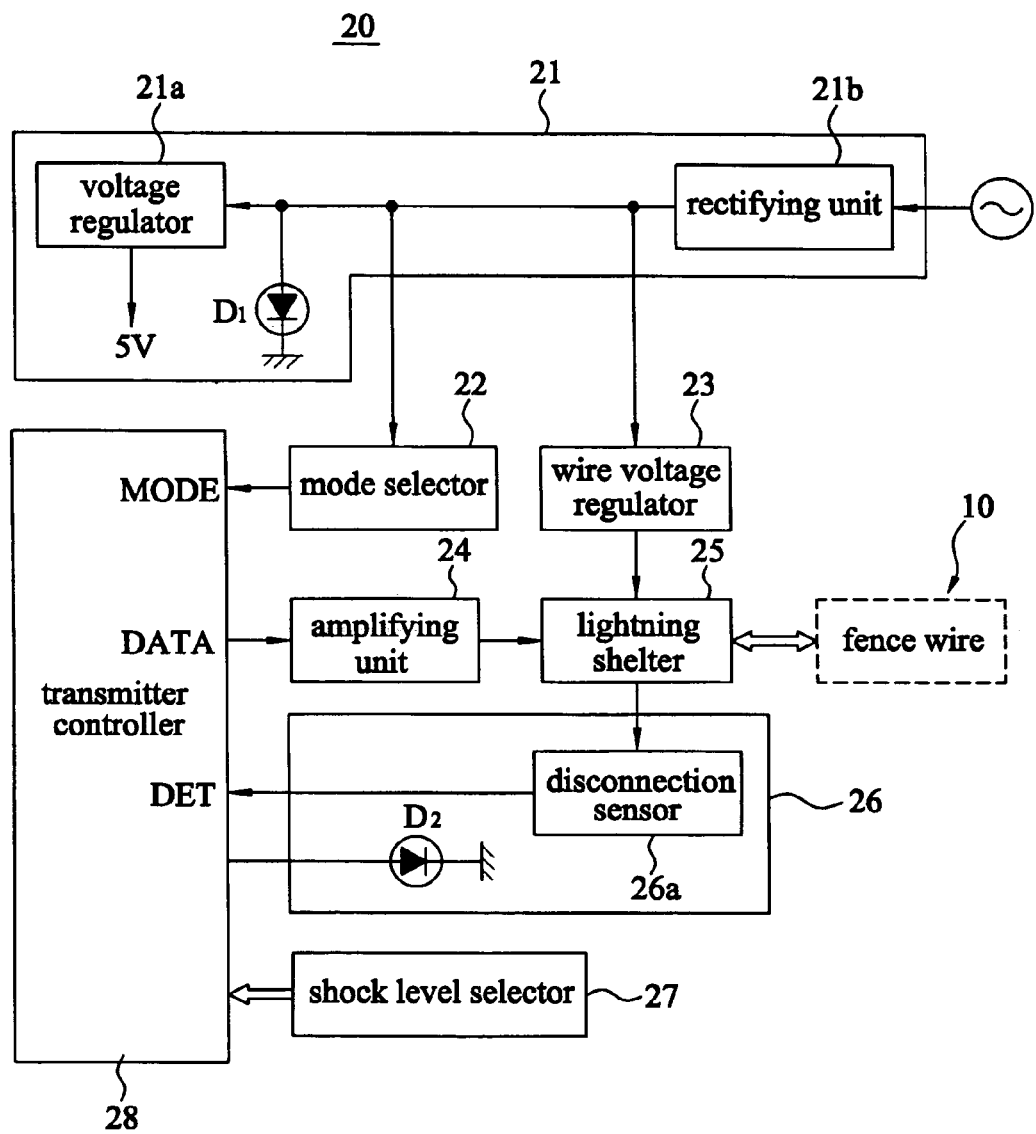
FIG. 4 is a block diagram showing the transmitter of an electronic fence system according to the present invention.

FIG. 4 is a block diagram showing the transmitter of an electronic fence system according to the present invention.

The transmitter consists of a power supplier 21 which receives an alternative current power source and supplies constant voltage; a mode selector 22 for selecting either electrical shock only; a combination of electrical shock and vibration; or a combination of electrical shock and vibration as well as sound; a disconnection display 26 for detecting a break in the fence wire 10; a shock level selector 27 for selecting a level of shock to the pet A; a transmitter controller 28 for controlling the above mentioned units and also transmitting a boundary display signal to the fence wire 10, the boundary signal includes data comprising a level inputted from the shock level selector 27, and for displaying a disconnection status according to a disconnection sensing signal transmitted from the disconnection display 26; and an amplifying unit for amplifying a signal transmitted to the fence wire 10 from the transmitter controller 28.

The power supplier 21 comprises a rectifying unit 21b for converting AC supplied from an AC source into DC; a voltage regulator 21a by which the DC source transmitted from the rectifying unit 21b is outputted with constant voltage; and a light emitting diode $D_1$ for displaying the operation status of the rectifying unit 21b.

A mode selector 22 turns power off or inputs a mode selective signal in the transmitter controller 28. The mode selector 22 can select either an electric shock only to a pet A or an electric shock as well as a vibration (or vibration accompanied by sound).

As the length of the fence wire 10 is dependent on the length of the fence, a wire voltage regulator 23 regulates the voltage using a variable resistor according to the length of the fence wire. A voltage is applied to the fence wire 10 through the power supplier 21.

For instance, when the length of the fence wire 10 is 2,000 ft, DC voltage +10V is applied to the fence wire 10 from the power supplier 21 by the control of the variable resistor. In this way, the level of voltage can be controlled so that the intensity of the radio signal does not become weak even though the length of the fence wire may vary.

An amplifying unit 24 amplifies a signal applied to the fence wire 10 from the transmitter controller 28. The signal (e.g. 10 kHz) applied to the fence wire 10 includes an identification no. a shock level signal and a mode select signal.

Figure 5:
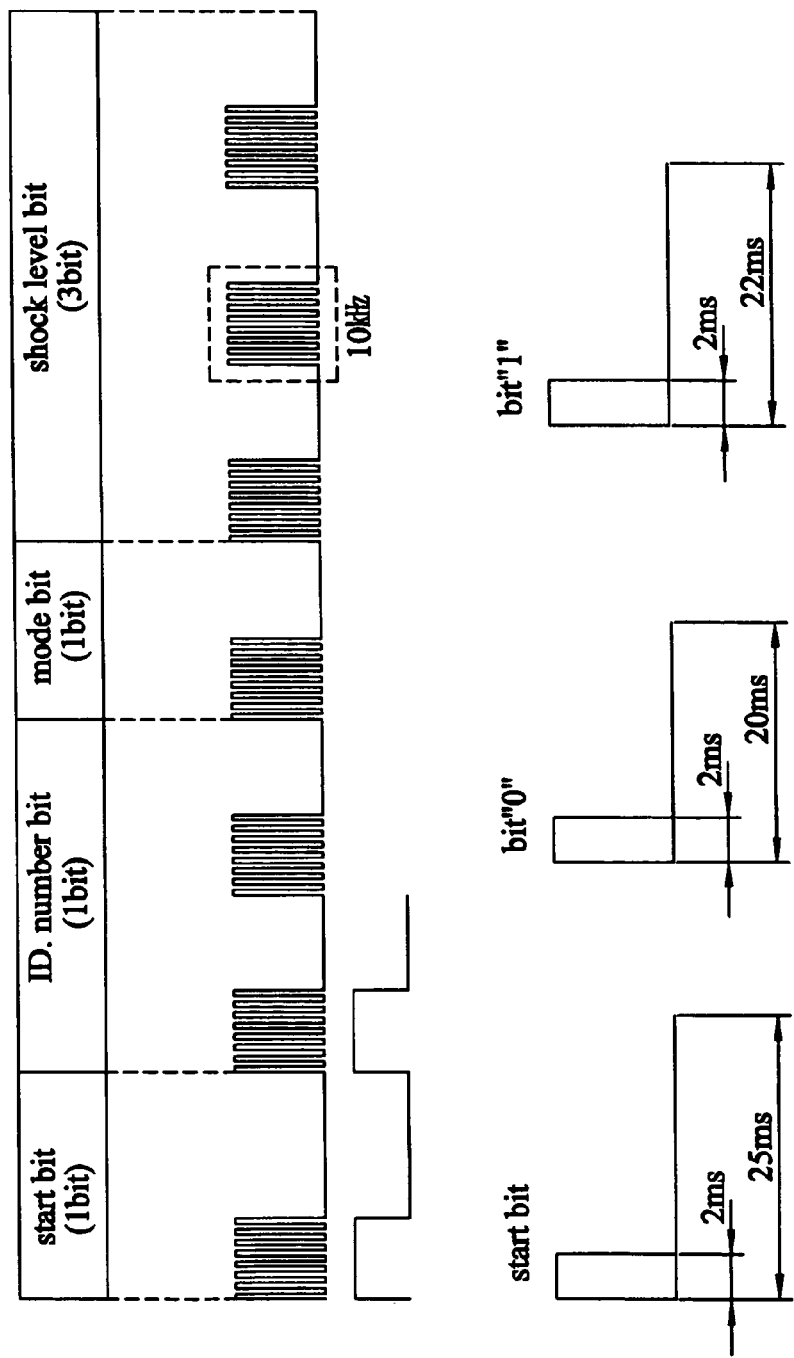
FIG. 5 is a view illustrating a format of data included in the radio signal applied to the fence wire by a transmitter.

FIG. 5 illustrates a format of data included in the radio signal applied to the fence wire by a transmitter.

The signal applied to the fence wire from the transmitter controller 28 is amplitude-modulated with a 10 kHz signal, and includes an identification number, a shock level, and mode selection data. In a format of the signal, an identification number bit, a mode level bit, and a shock level bit are radiated orderly.

A start bit generates a 10 kHz signal for 2 ms, and outputs a data signal after the lapse of 23 ms, thus showing a start bit. A data signal representing "0" generates a 10 kHz signal for 2 ms. A data signal outputs again after the lapse of 18 ms, and a data signal representing "1" generates a 10 kHz signal for 2 ms. A data signal outputs again after the lapse of 20 ms.

A form and a format of a signal may be changed, and a bit of each signal can be increased or decreased within a range which does not hinder communication.

Figure 6:
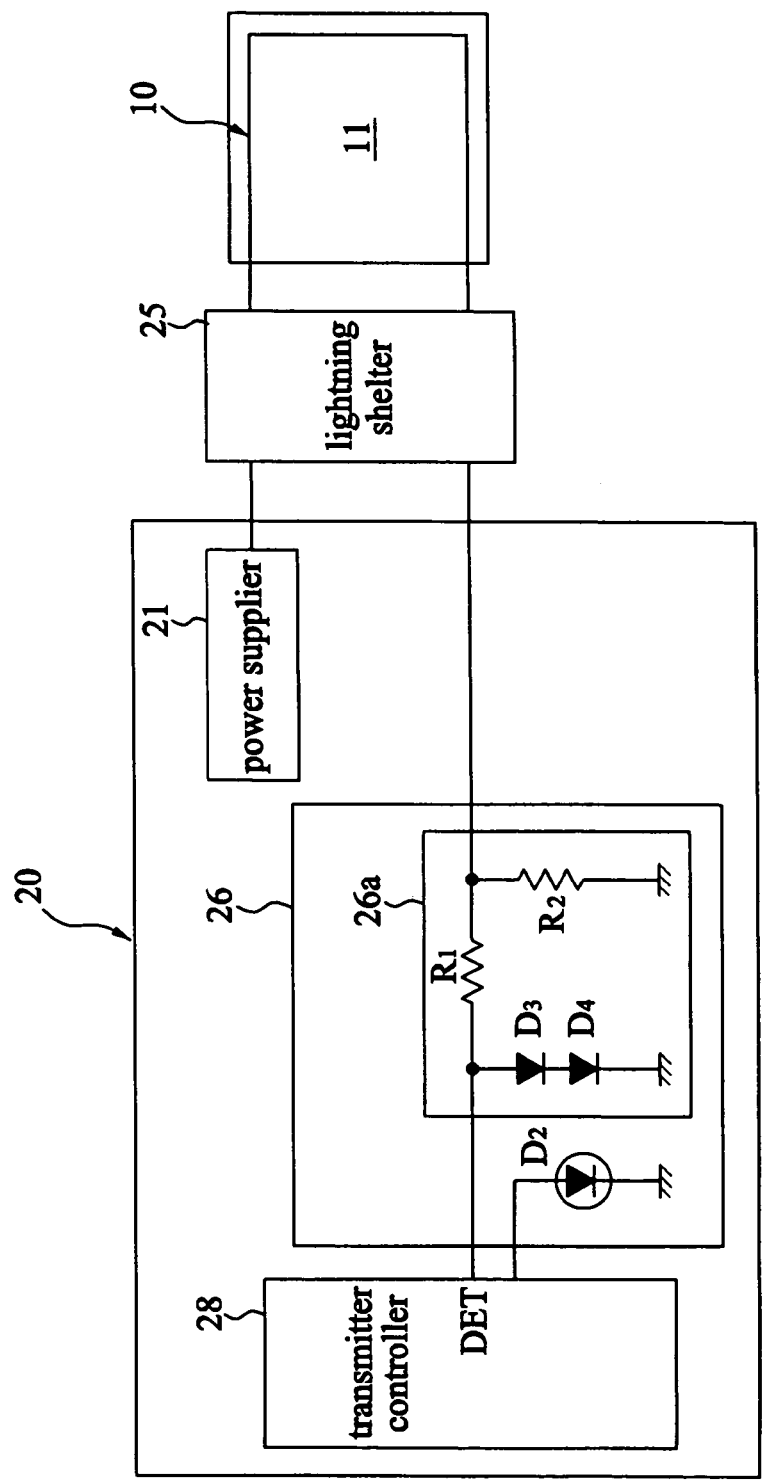
FIG. 6 is a schematic illustration of the operation of a disconnection display according to the present invention.

FIG. 6 is a schematic illustration of the operation of a disconnection display according to the present invention.

The lightning shelter 25 obstructs high voltage flowing into or through both the ac source and the fence wire 10 owing to lightning.

The disconnection display 26 comprises a disconnection sensor 26a first for sensing whether it has a disconnection or not by measuring the voltage power applied to the fence wire at one end of the fence wire and second for sending the sensing status to the transmitter controller 28. The disconnection display also includes a disconnection display emit diode $D_2$ for displaying disconnection status according to a control of the transmitter controller 28.

As shown in FIG. 6, the dc +10V is applied to one end of the fence wire 10 from the power supplier 21. The other end of the fence wire 10 is connected to the disconnection detect terminal DET of the transmitter controller 28 through the lightning shelter 25 and disconnection sensor 26a.

The disconnection sensor 26a comprises a first resistance $R_1$, connecting between an output terminal of the lighting shelter 25 and the disconnection detect terminal DET of the transmitter controller 28; a second resistance $R_2$, connecting between the disconnection detect terminal DET of the transmitter controller 28 and the ground; and diode $D_3$, $D_4$ for preventing overvoltage from applying against a disconnection detect terminal DET of the transmitter controller 28.

Therefore, if the fence wire is disconnected, the voltage (e.g. dc +10V) outputted from the power supplier 21 is not detected at the disconnection detect terminal DET of the transmitter controller 28, and no source exists, which indicates a disconnection.

A signal selecting a level of shock to pet A is inputted to the transmitter controller 28 by the level selector 27. The level selector 27 may consist of a switch, by which several levels are converted to binary number data.

If either shock mode only; vibration mode followed by a shock; or vibration accompanied by a sound and followed by a shock is chosen by a mode selector 22, the source is applied and the corresponding signal (e.g. vibration mode followed by a complementary shock) is inputted to the transmitter controller 28.

The mode data representing either shock mode only, or vibration mode followed by a shock (e.g. bit indicating 1 as shown in FIG. 5) is superimposed on the radio signal to be outputted by the transmitter controller 20.

Figure 7:
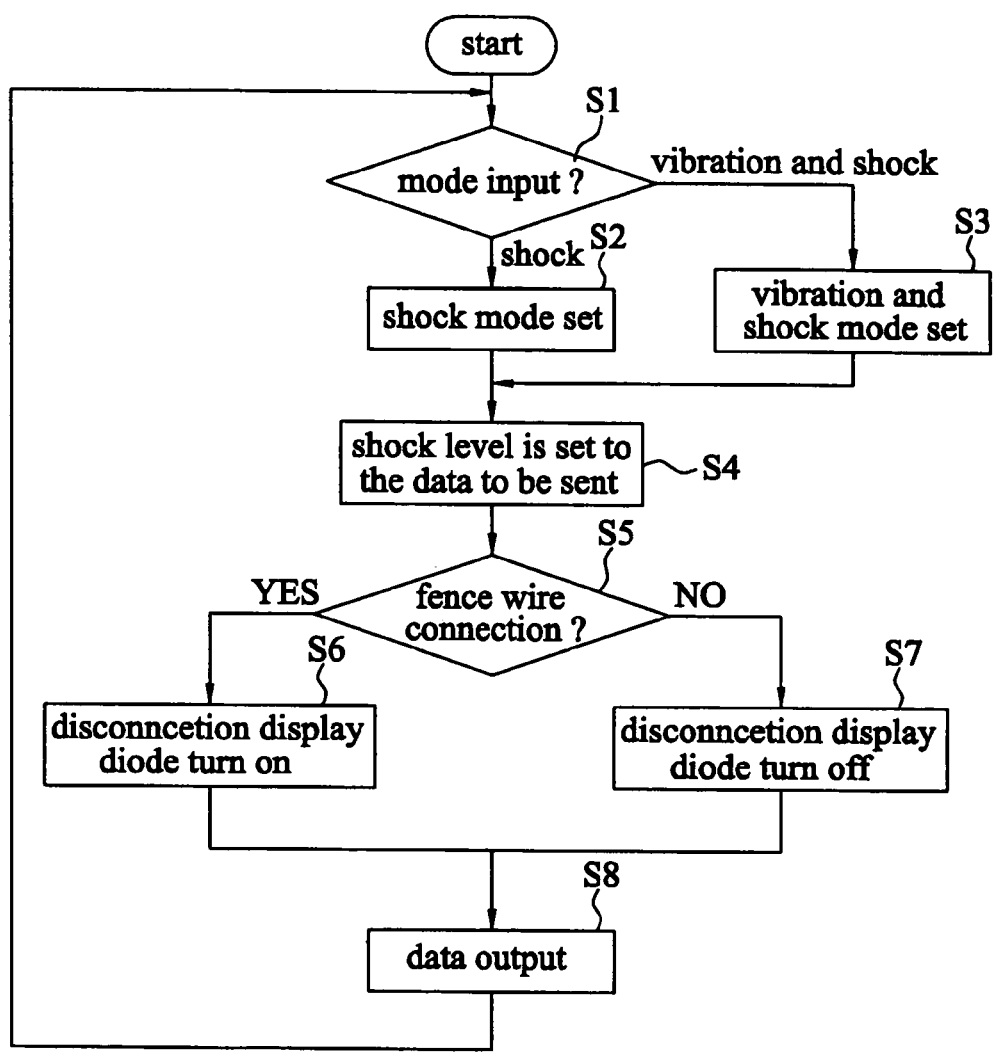
FIG. 7 is a flow chart showing a method for controlling the transmitter according to the present invention.

FIG. 7 illustrates a flow chart showing a method for controlling the transmitter according to the present invention.

The transmitter controller 28 receives a mode selection signal from the mode selector 22, and determines the mode (step S1). If the shock mode is inputted, the data to be sent to the receiver 30 is set as a shock mode (step S2). However, if the vibration mode (or vibration accompanied by sound) followed by a shock is inputted, the data to be sent to the receiver 30 is set as a vibration mode (or vibration with sound) followed by a complementary shock mode (step S3).

The shock level is received from the shock level selector 27, and the data to be sent to the receiver 30 is set accordingly (step S4).

After setting the shock level, it is determined whether the fence wire 10 is connected depending on the signal that is received from the disconnection sensor 26a (step S5). If the fence wire 10 has a connection, the disconnection display diode $D_2$ is turned on (step S6). If no connection exists in the fence wire 10, the disconnection display diode $D_2$ is turned off (step S7).

Subsequently, the 10 kHz signal including a set mode, a shock level and an identification number as shown in FIG. 5 is outputted to the fence wire 10 (step S8), and returns to step S1 to execute the above steps repeatedly.

Figure 8:
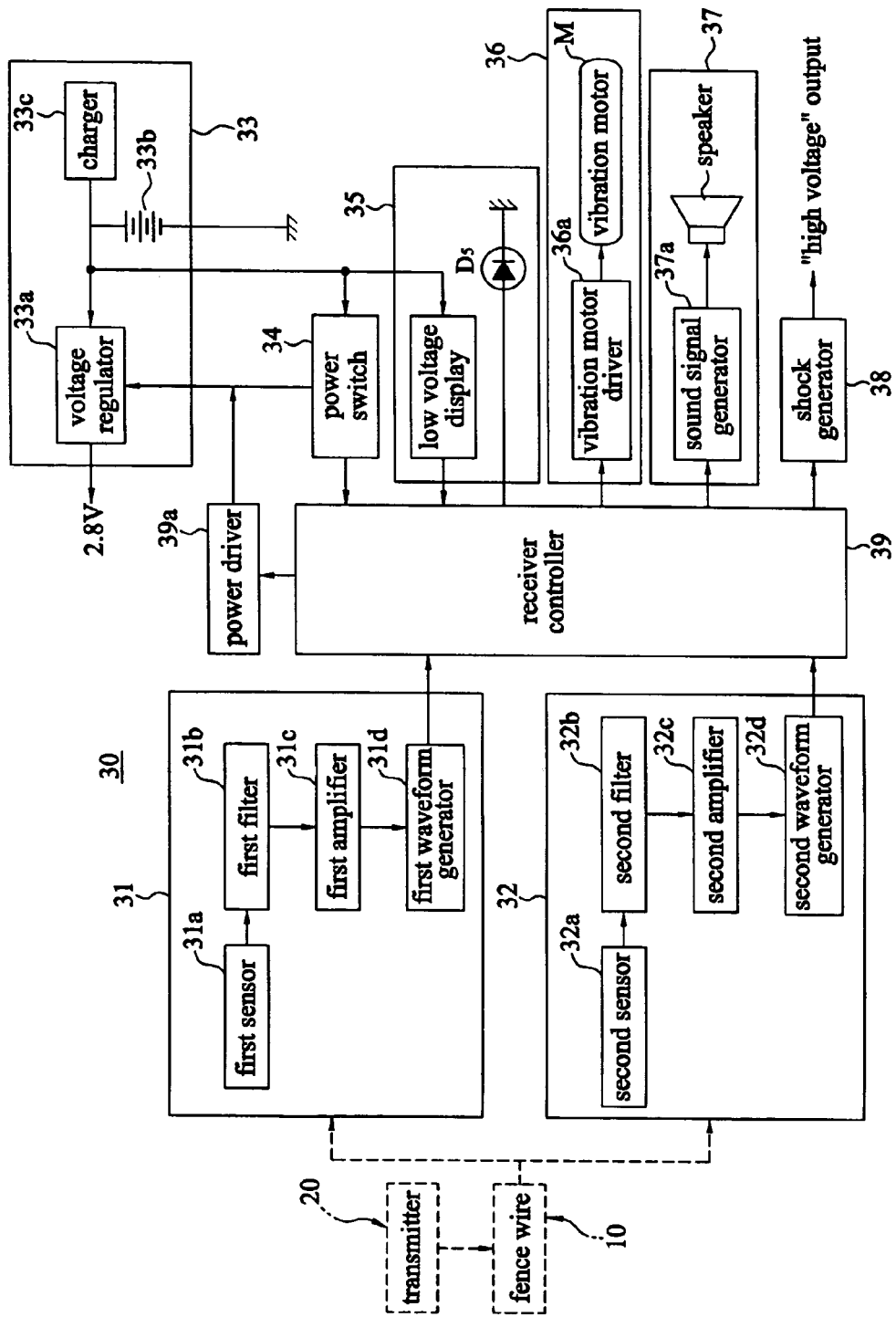
FIG. 8 is a block diagram illustrating components of a receiver according to the present invention.

FIG. 8 is a block diagram illustrating components of a receiver according to the present invention.

The receiver 30 of the electronic fence system comprises a first and a second sensor unit 31,32 for transforming radio signal radiated from the fence wire 10 into binary digit data; a power supplier 33 including a voltage regulator 33a, a recharge battery 33b, and a charger 33c; a power switch 34 for applying power to the power supplier 33 while the user pushes the power switch 34; a low voltage display 35 for sensing the voltage of the recharge battery 33b and for displaying its low voltage status; a vibration generator 36 for applying a vibration to the pet A according to the command of the receiver controller; a sound signal generator 37 for generating a sound according to the command of the receiver controller; a shock generator 38 for giving an electrical shock to the pet A according to a control of the receiver controller; a receiver controller 39 for controlling the respective units depending on signals received from the transmitter through the first and second sensor 31,32; and a power driver 39a for continually applying power to the power supplier 33 according to the power hold signal received from the receiver controller.

The power switch 34 is composed of a switch (e.g. tact switch) which can supply electricity to the receiver 30 while the user pushes the switch for a predetermined period. The switch can be prevented from being pushed by an exterior object when a pet A approaches an exterior object (e.g. the branches of a tree, furniture etc.).

Therefore, the receiver controller 39 applies an operation signal to the power driver 39a to apply an electric resource if the user pushes the power switch more than 0.5 second. An electric resource is continually applied to the receiver 30 by the operation signal.

Further, the power supplier 33 comprises a voltage regulator 33a, a recharge battery 33b, and a charger 33c. The voltage of the recharge battery 33b is detected by a low voltage sensor 35a, and then a low voltage signal is sent to the receiver controller 39 if the voltage of the battery is less than a predetermined voltage value. The receiver controller 39 receiving the low voltage signal turns on the low voltage display emit diode $D_5$, which indicates the low voltage status.

The first sensor unit 31 comprises a first sensor 31a, a first filter 31b, a first amplifier 31c, and a first waveform generator 31d. The first sensor 31a includes a coil, by which a radio signal radiated from the fence wire 10 can be received. Only a signal having more than a predetermined level can be sensed.

Therefore, the radio signal radiated from the fence wire 10 is sensed by the first sensor 31a in case the pet A approaches the fence wire 10 within a certain distance (e.g. 10 m).

Since the radio signal has a high frequency noise, only a 10 kHz signal can be passed through the first filter 31b. It is amplified by the first amplifier 31c, and finally an accurate pulse wave is formed by the first waveform generator.

Therefore, as shown in FIG. 5, a serial bit signal consisting of a start bit signal, an identification bit signal, a mode bit signal, and a shock level bit signal in order is outputted.

The second sensor unit 32 has the same components as the first sensor unit 31, and therefore needs no further description here.

The data signal detected by the first sensor unit 31 or the second sensor unit 32 is inputted to the receiver controller 39, which can read the mode data and the shock level data included in the data signal. The receiver controller 39 controls the vibration generator 36, a sound signal generator 37, and the shock generator 38 to generate only an electrical shock; a combination of electrical shock after a vibration; or a combination of electrical shock after vibration and accompanied by sound depending on the mode and shock level.

The vibration generator 36 comprises a vibration motor driver 36a to generate a vibration signal under the command of the receiver controller 39, and a vibration motor M to generate a vibration according to the vibration signal.

If the pet A wearing the receiver 30 approaches a boundary of the confined area 11, the receiver 30 receives a radio signal radiated from the fence wire 10, and the receiver controller 39 sends the drive control signal to the vibration motor driver 36a to generate a vibration signal according to the data included in the radio signal. Finally, the vibration signal is applied to the vibration motor M to generate a vibration.

The vibration motor M can generate the vibration that is provided by the rotation of a counterweight attached to a shaft. The shaft is rotated by a magnetic field which is formed via a current flowing through a coil and an electromagnetic force that is generated by the interaction of the magnetic field formed by the magnetic.

The vibration is transferred to the case of the receiver 30, and gives a vibration to the pet A wearing the receiver. Thus, a warning signal can be given to the pet A, without using sound or vision. Further, a sound produced at the sound generator 37 as well as a vibration produced at the vibration motor M can be used as a warning signal.

The sound generator 37 comprises a sound signal generator 37a for generating a sound signal under the command of the receiver controller 39, and also a speaker SPK to convert the sound signal to a sound.

The sound signal generator 37a can be composed of a sound integrated circuit (IC) in which sound data like "stop" etc. is stored. If a pet A approaches the fence wire 10 installed near the boundary of the confined area 11, the sound IC is triggered to generate a sound signal like "stop" etc. The sound signal is converted to a sound at the speaker SPK and can give a warning to the pet A.

Figure 9:
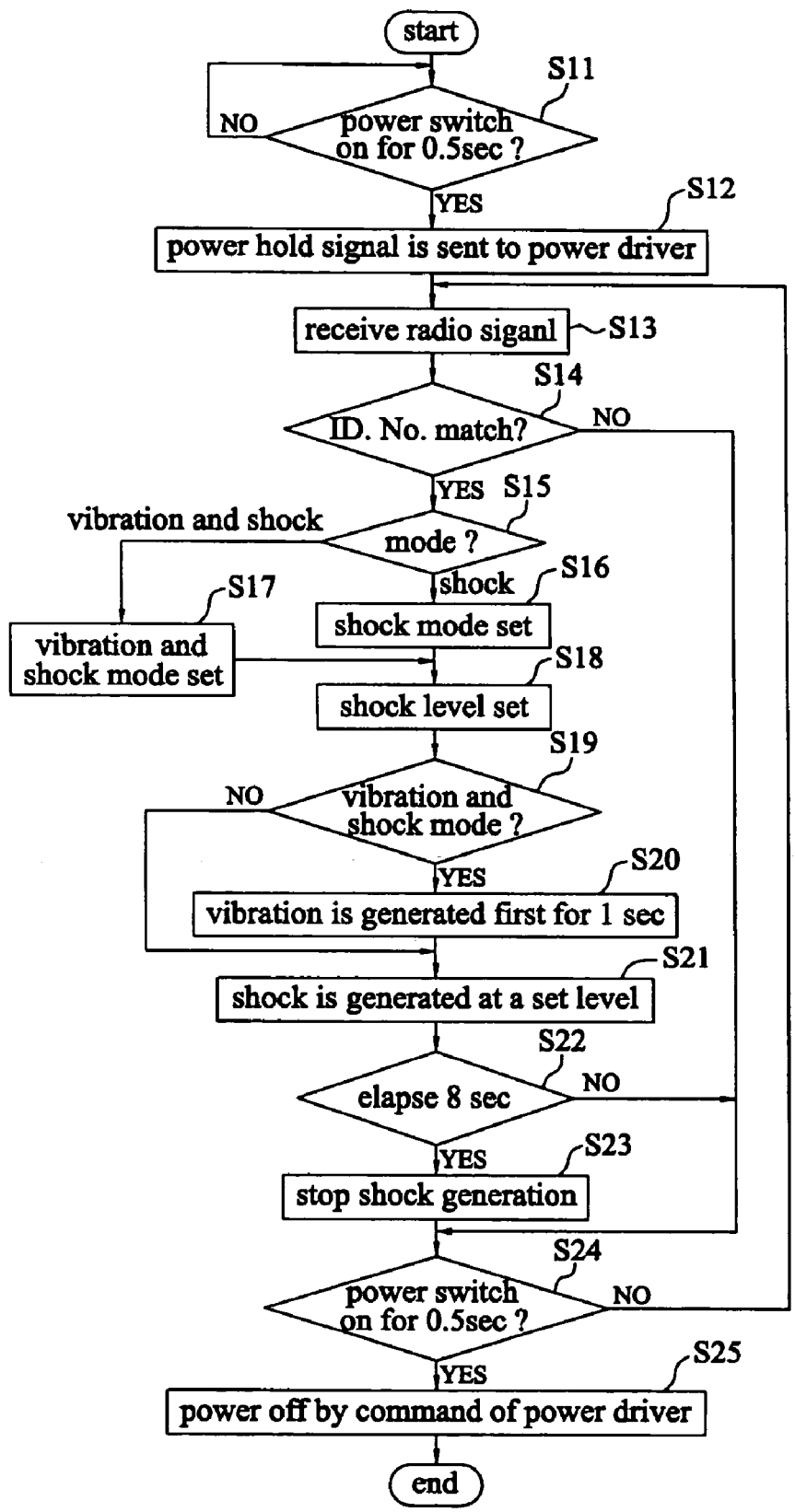
FIG. 9 is a flow chart illustrating a method to control the receiver of an electronic fence system according to the present invention.

FIG. 9 is a flow chart illustrating a method to control the receiver of an electronic fence system according to the present invention.

If the user pushes the power switch 34, it makes a decision whether the power switch has an ON status for 0.5 second (step S11). If at step S11 the ON status is detected, a power hold signal is sent to the power driver 39a, and the voltage regulator 33a is operated which continually applies an electric resource to the power supplier 33 (step S12).

The radio signal is received through the first sensor unit and the second sensor unit 31, 32, and the identification no., mode and shock level data included in the radio signal are inputted (step S13). The unit determines whether the identification no. has a correspondence (step S14).

If the identification no has a correspondence, the mode data included in the received signal is received and it determines whether the mode is "shock only" or "vibration (or vibration with accompanying sound) and a shock" (step S15). In the case of "a solely shock mode", a flag bit is set as "a solely shock mode" (step S16), and in the case of "a vibration (or vibration with accompanying sound) and a shock", a flag bit is set as "a vibration (or vibration with accompanying sound) and a shock" (step S17).

Sequentially, the shock level data included in the received radio signal is read and the shock level is set at a flag bit (step S18). At step S19, the controller determines whether the mode is "a vibration (or vibration accompanied by sound) and a shock". If it is, a vibration (or vibration accompanied by sound) is generated first for 1 second (step S20), and next the shock is generated at a set level (step S21).

At step S19, if it is not "a vibration (or vibration accompanied by a sound) and a shock", the controller goes to step S21, and the shock is generated at a set level. It determines whether the generation of a shock elapses for 8 seconds, and then makes a decision (step S22).

At this point, since the shock is applied after the generation of a warning vibration, the pet A recognizes, due to being trained, through training that it has entered an Off-limits area (e.g. less than 10 m from the fence wire 10).

If the pet A moves, due to being trained, to a safe area from the fence wire 10, no radio signal is received and no shock is applied to a pet A during a repetition of a radio signal receive step S13 and a confirmation step S14 for an identification no. However, if a pet A does not move away from the fence wire 10, a shock is continued for a period of 8 seconds and a pet A can be badly damaged with a great shock. Thus, the shock generator 38 is controlled to terminate a shock generation (step S23).

At the next step S24, it determines whether the status of the power switch 34 is ON. It has been pushed for 0.5 second. If it is not, it returns to step S13 to execute the following steps. If it is, it is determined as power off status, and power is turned off by the command of the power driver 39a and the execution of the program is terminated (step S25).

The receiver controller 34 can operate the power driver 39a only when the power switch 34 is turned on after being pushed for a predetermined period (e.g. 0.5 second). Thus, the power supplier 33 applies power to the receiver 30, and prevents the receiver 30 from operating arbitrarily due to an exterior object.

If the pet A moves into the confined area (e.g. within 10 m from the fence wire 10), a vibration (or a vibration accompanying sound) is given to the pet A, without directly applying an electric shock. If the pet A remains in the confined area, the shock is again given to the pet A, which recognizes by training that it is in the confined area. When the pet A moves away from the confined area, no more shock is applied.

The unit can be set so that a shock is applied within a range of 10 m in either direction from the fence wire 10. Even if the pet A dashes through (e.g. 30 km/h), the shock is continually given while it trespasses across the confined area, thus causing the pet to move back to a safe area.

As mentioned previously, the inventive electronic fence system installs the fence wire 10 along a boundary of the fence. When a pet approaches near the fence wire 10, a shock is applied to the pet directly or a vibration (or a vibration accompanied by sound) followed by a shock is given to the pet. However, in another embodiment, a radio fence method can be employed in which an antenna is established at a center of the fence. If the pet moves a predetermined distance from the antenna, a shock is applied or a vibration (or accompanying a sound) followed by a shock is given.

Figure 10:
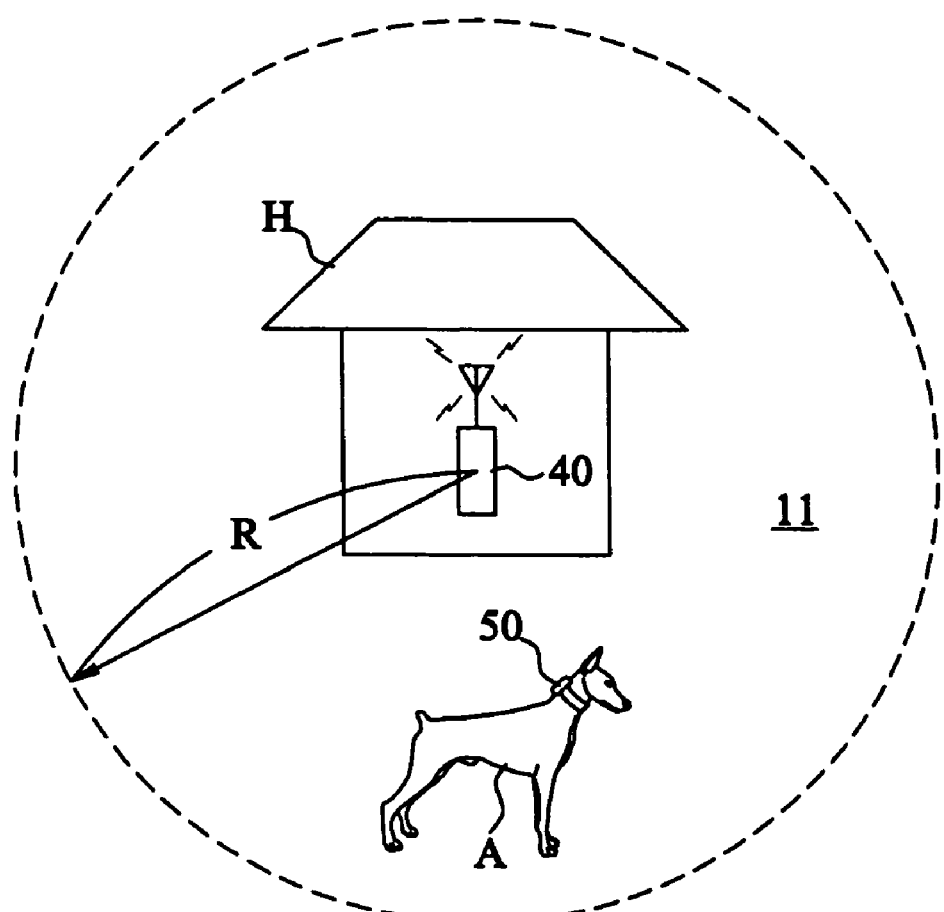
FIG. 10 is a schematic view of a radio electronic fence system according to another embodiment of the present invention.

FIG. 10 is a schematic view of a radio electronic fence system according to another embodiment of the present invention. As illustrated, the frequency modulation radio signal being released into the air through an antenna ANT is attenuated in proportion to a traveling distance. The FM radio signal is detected by the receiver 50 worn on the neck of a pet A in the confined area 11 which has a predetermined distance R from the transmitter 40. Therefore, if the pet A goes out of the confined area 11, the FM signal cannot be detected by the receiver 50. The transmitter 50 which isn't receiving the FM radio signal gives either a vibration (or vibration accompanied by sound) followed by an electric shock or only an electric shock to the pet A.

Figure 11:
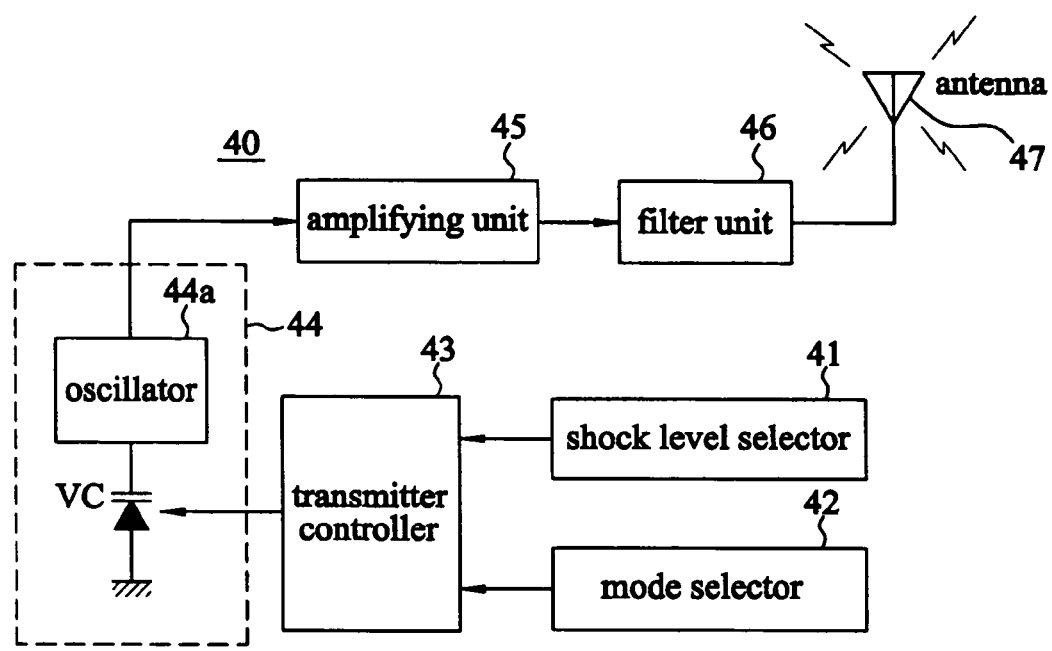
FIG. 11 is a block diagram illustrating a component of a transmitter of a radio electronic fence system which displays a boundary using a radio according to the present invention; and, FIG. 12 is a block diagram illustrating components of the receiver of a radio electronic fence system according to the present invention.

FIG. 11 is a block diagram illustrating a component of a transmitter of a radio electronic fence system that displays a boundary using a radio according to the present invention.

The transmitter 40 of the radio electronic fence system comprises a shock level selector 41 for setting the level of shock to the pet A; a mode selector 42 for selecting either a shock mode only, or vibration mode (or vibration accompanied by sound) followed by a shock mode; a transmitter controller 43 for outputting data corresponding to the level inputted from the shock level selector 41 and the mode inputted from the mode selector 42; an oscillating unit 44 for generating an FM signal which is varied by data outputted from the transmitter controller 43; an amplifying unit 45 for amplifying the FM signal outputted from the oscillating unit 44; a filter unit 46 for blocking the high frequency noise signal and passing the FM signal; and an antenna 47 for emitting the FM signal outputted from the filter unit 46 to the air.

The data of shock level and mode, which is inputted through the shock level unit 41 and the mode selector 42 by the user, is sent to the oscillating unit 44 from the transmitter controller 43. Thus, a capacitance is varied at a varactor VC of the oscillating unit, and a signal generated from the oscillator 44a is outputted with FM depending on the data.

The FM signal (e.g. 27 MHz FM signal) produced by the oscillating unit 44 is amplified at the amplifying unit to be outputted. Since the size of the confined area needed is different for each user, an amplifying ratio of the amplifying unit 45 can be varied to control the size of the confined area according to each user's circumstances.

The FM signal produced at the amplifying unit 46 can pass as a signal having a predetermined frequency (e.g. lower than 27 MHz FM) at the filter unit 46, and be applied to the antenna 47 to emit the air.

The method for controlling the transmitter 40 is the same as the method explained in FIG. 7 using a flow chart, and therefore needs no further description here.

FIG. 12 is a block diagram illustrating components of the receiver of a radio electronic fence system according to the present invention.

In the receiver 50, an antenna 51 (for receiving an FM radio signal emitted from the transmitter 40), and a radio receiver 52 (for receiving an FM radio signal through the antenna 51 and also for detecting data included in the radio signal) are substituted for the first and second sensor unit 31,32 as shown in FIG. 8. The remaining components are the same as those shown in FIG. 8, and therefore need no further description here.

The receiver 50 is almost similar to the receiver 30 of the electronic fence system in which its fence wire 10 emits a boundary display signal. However, the components are different in that the antenna 51 and the radio receiver 52 which receive an FM radio signal to detect the data is substituted for the first and the second sensor units 31,32.

The radio receiver 52 comprises an RF amplifying unit 52a for amplifying an FM radio signal received through the antenna 51, an IF unit 52b for detecting a midrange of frequency from the FM radio signal produced at the RF amplifying unit 52a, and a data detector 52c for detecting a data signal from the midrange of frequency outputted from the IF unit 52b.

The FM radio signal that is radiated from the transmitter 40 and is received through the antenna 51 is amplified at the RF amplifying unit 52a. Since the amplified signal is the 27 MHz FM radio signal, the signal is converted to a midrange of frequency (e.g. 455 kHz) at the IF unit 52b.

The midrange of frequency produced at the IF unit 52b has data including a start bit, an identification no. bit, and a shock level bit as shown in FIG. 5. The data is detected at the data detector 52c and is then sent to the receiver controller 59.

In the same way, the method for controlling the receiver 50 (step S13 as shown in FIG. 9) must be substituted with a confirmation block for receiving an FM radio signal. If an FM radio signal is received, it determines whether the FM radio signal is continual. If no FM radio signal is received, the process after step S14 is executed, and therefore needs no further description here.

In this embodiment of the electronic fence system, if a pet A wanders in the confined area 92, the receiver 50 worn on the pet A can receive an FM radio signal. Thus, the operation to apply a shock and a vibration (or vibration accompanied by sound) is not executed, and maintains a continual standby status.

On the other hand, if the receiver 50 does not receive the FM radio signal, the entire process after step S14 as shown in FIG. 9 is executed.

If a pet A, also in the embodiment of the electronic fence system, moves out of the confined area 11, an electric shock is not directly applied, but a vibration (or vibration accompanied by sound) followed by a shock must be applied. That is, it determines that a pet A is staying out of the confined area 11, and if it is out of the area, a shock is repeatedly applied.

With training, a pet A recognizes that it is out of the confined area and moves into the confined area 11. No more shock to the pet A is applied. This prevents the pet A from being damaged by great electric shock.

According to the present invention, as a pet tries to move out of the confined area, a vibration or a vibration accompanying sound is first applied to the pet, and then an electric shock is applied. Thus, even if the pet has a hearing loss, or the circumference is noisy, a warning signal saying, "don't go out of the fence" can be given through a touch to the skin of the pet. Further, since a vibration is applied first, and the shock follows it, no severe shock need be applied to the pet that will return into the confined area after having received a vibration.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An electronic fence system comprising:
a fence wire buried in a yard along the boundary of a confined area within which a pet may move about freely, and which radiates a radio signal for defining a boundary;
a transmitter electrically connected to the fence wire and transmitting a boundary radio signal for defining the boundary to the fence wire, the boundary signal including a mode selection signal for selecting a direct shock mode to the pet or a combination shock mode after first producing a sound; and
a receiver attached to the pet, that receives the boundary radio signal for defining the boundary with respect to a pet's approach to the fence wire, and that generates either electrical shock only, or electrical shock and vibration as well as sound depending on the mode selection signal, comprised of a first and a second sensor unit for receiving the boundary radio signal from the fence wire and transforming the boundary radio signal into binary data, a power supplier including a voltage regulator, a recharge battery, and a charger, a power switch for applying power to the power supplier while the user pushes the power switch, a low voltage display for sensing the voltage of the recharge battery and for displaying its low voltage status, a vibration generator for applying a vibration to the pet according to the command of the receiver controller, a sound signal generator for generating a sound according to the command of the receiver controller, a shock generator for giving an electrical shock to the pet according to the command of the receiver controller, a receiver controller for receiving the signal sent from the transmitter through the first and the second sensor, and controlling the respective units for giving either electrical shock only, or a combination of electrical shock and vibration as well as sound or electrical shock and vibration as well as sound depending on the mode selection signal to the pet according to the command of the receiver controller and a power actuator for continually applying power to the power supplier according to a power hold signal received from the receiver controller.

2. The electronic fence system of claim 1 wherein the transmitter further includes:
   a power supply unit which receives alternating current power source and supplies constant voltage;
   a mode selector for selecting either electrical shock only, a combination of electrical shock and vibration; or electrical shock and vibration as well as sound to the pet;
   a disconnection display for sensing a breaking of the fence wire, generating a disconnection signal, and displaying a disconnection;
   a shock level selector for selecting a level of shock to the pet;
   a transmitter controller for controlling the above units and transmitting a boundary display signal to the fence wire the boundary signal including a data comprising a level inputted from the shock level selector and a mode transmitted from the mode selector, and the transmitter controller for displaying a disconnection status according to a disconnection sensing signal transmitted from the disconnection display; and
   an amplifying unit for amplifying a signal transmitted to the fence wire from the transmitter controller.

3. The electronic fence system of claim 2, wherein the signal that is applied to the fence wire from the transmitter controller is an amplitude modulation signal modulated with a 10 kHz signal, and the signal includes an identification number, a shock level, and mode selection data.

4. The electronic fence system of claim 2, wherein the intensity of the radio signal radiated from the fence wire is dependent on the receiver, which is attached to the pet, approaching within 10 m from the boundary of the confined area.

5. The electronic fence system of claim 2, wherein the disconnection display comprises a disconnection sensor for sensing whether it has been disconnected or not by measuring the voltage power applied to the fence wire at one end of it, and also for sending the sensing status to the transmitter controller, and the disconnection display also includes a disconnection display emit diode for displaying the disconnection status according to the control of the transmitter controller.

6. The electronic fence system of claim 1, wherein the first sensor unit and the second sensor unit comprise a first and a second sensor, a first and a second filter, a first and a second amplifier, and a first and a second waveform generator, respectively.

* * * * *